United States Patent Office 2,913,478
Patented Nov. 17, 1959

2,913,478

METHOD OF EFFECTING HYDROLYSIS OF ONE OF THE TWO NITRILE GROUPS OF ALIPHATIC DINITRILES

Clau Berther, Chur, and Johann Giesen, Haldenstein, near Chur, Switzerland, assignors to Inventa A.-G. fur Forschung und Patentverwertung Lucerne, Lucerne, Switzerland No Drawing. Application July 27, 1956
Serial No. 600,398

Claims priority, application Switzerland July 30, 1955

1 Claim. (Cl. 260—465.4)

The present invention relates to a method of effecting hydrolysis of one of the two nitrile groups of an aliphatic dinitrile.

It is known that aliphatic dinitriles can be hydrolyzed by acids or bases to the corresponding diamides. If however, only one of the two nitrile groups is to be hydrolyzed difficulties are encountered. According to Wiley and Morgan (J. of Org. Chem. 1950, vol. 15, p. 800) adiponitrile can be unilaterally hydrolyzed by hydrogen peroxide and caustic potash solution to form $\omega$-cyanovaleramide. However, the yield obtained by this method is small.

It has now been found that aliphatic dinitriles can be unilaterally hydrolyzed with a weaker base than caustic soda or caustic potash solution, preferably with ammonia. Then, besides unconverted dinitrile, the main reaction products are cyanocarboxamides and cyanocarboxylic acids. The hydrolysis of adiponitrile and its higher homologues is of particular interest in connection with the manufacture of known polyamides. The $\omega$-cyanovaleramide and the $\omega$-cyanovaleric acid which are thereby obtained can be reduced by known methods to $\omega$-aminocaproic acid, the corresponding lactam being formed as a by-product. Whereas dinitriles of which the nitrile groups are separated by more than three carbon atoms and more specifically by three methylene groups can be hydrolyzed by this process, the lower homologues are not suitable for this reaction.

The bases which are preferred are ammonia and aluminum hydroxide. If soda is used for the hydrolysis, the reaction proceeds only in minimum amounts in the desired direction but the desired products are not obtained if calcium hydroxide or barium hydroxide are used.

The process is advantageously carried out by heating the dinitrile to be hydrolyzed in the form of an aqueous emulsion to a temperature of 100–250° C. for 1–10 hours with approximately 10 times by volume the amount of a solution of the base, the materials being well stirred. Preferably, the temperature is from 180–200° C. and the time of treatment approximately 3 hours. An alcoholic aqueous solution can also be used but in this case, conversion is considerably less than when the process is carried out in aqueous emulsion. Depending on the conditions, a certain proportion of the corresponding diamide is formed but this can easily be reconverted into the dinitrile.

If ammonia is used, this should preferably be in a 1–5 N solution. If a concentrated ammonia solution is used instead of a dilute solution, considerable quantities of diamide are obtained.

The reaction product is worked-up by filtering and washing with a small amount of alcohol. After this, it is evaporated, treated with ethyl acetate and filtered from a small amount of precipitated diamide. The solution is again evaporated and the residue distilled in vacuum.

*Examples*

(1) 54 parts by volume of adiponitrile in 500 parts by volume of 2 N ammonia are treated for 2 hours in an autoclave at 200° C. After cooling, the product is filtered and washed with a small quantity of alcohol. The residue consists of 9.5 parts of adipamide. The filtrate is evaporated in vacuum and dissolved in 300 parts by volume of ethyl acetate. Traces of adipamide remain undissolved. These are filtered off and the filtrate is evaporated. The residue is thereafter distilled at 1 mm. Hg. 19.5 parts of unconverted adiponitrile are obtained. The main fraction consists of 24.3 parts of a mixture of $\omega$-cyanovaleramide and $\omega$-cyanovaleric acid, the ratio of the two components being about 1:1. 1.5 parts remain behind in the residue.

(2) 54 parts by volume of adiponitrile are treated as described in Example 1. However, instead of 2 N ammonia, 500 parts by volume of water and 30 parts of freshly precipitated aluminum hydroxide are used. 14.2 parts of the dinitrile are unconverted and 9 parts of a mixture of $\omega$-cyanovaleramide and $\omega$-cyanovaleric acid in a ratio of 1:1 are obtained.

(3) 61 parts by volume of pimelic acid dinitrile in 500 parts by volume of 2 N ammonia are treated for three hours at 180° C. After cooling, the product is filtered and washed with ethanol and the filtrate is evaporated. The residue is distilled at 0.5 mm. Hg. 34.75 parts of pimelic acid dinitrile and 21.5 parts of $\omega$-cyanocapronamide are obtained in which traces of cyanocaproic acid are contained. The $\omega$-cyanocapronamide can be obtained pure by recrystallisation from ethyl acetate (F: 89–91° C., melting point).

(4) 68 parts by volume of suberic acid dinitrile are treated and worked-up in a similar manner to that described in the preceding example. 36.5 parts of unconverted dinitrile and 18 parts of $\omega$-cyanooenanthamide are obtained which contain traces of $\omega$-cyanooenanthic acid. The $\omega$-cyanooenanthamide can be obtained pure by recrystallisation from ethyl acetate (F: 76° C., melting point).

What is claimed is:

A method of hydrolyzing only one of the nitrile groups of the dinitriles from the class consisting of adipic acid dinitrile, pimelic acid dinitrile and suberic acid dinitrile to obtain substantially the corresponding monoamides, which comprises hydrolyzing said dinitriles in aqueous emusion with approximately ten times by volume of a 1–5 N weak base of the class consisting of aluminum hydroxide and ammonium hydroxide at a temperature of 100–200° C.

References Cited in the file of this patent

UNITED STATES PATENTS 2,322,273    Biggs _____ June 22, 1943

OTHER REFERENCES

Krewson et al.: J.A.C.S., vol. 65, (1943) pp. 2256–2257.

Wiley et al.: Jour. Org. Chem., vol. 15, pp. 800–1 (1950).

Groggins: Unit Processes in Organic Synthesis, 4th ed., 1952, pp. 652, 656.